US011787888B2

United States Patent
Zhao et al.

(10) Patent No.: US 11,787,888 B2
(45) Date of Patent: Oct. 17, 2023

(54) ACRYLAMIDE COPOLYMER AND PREPARATION METHOD THEREFOR AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Fangyuan Zhao, Beijing (CN); Zhuo Yi, Beijing (CN); Xiaochun Wang, Beijing (CN); Jie Yang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 115 days.

(21) Appl. No.: 17/413,988

(22) PCT Filed: Dec. 17, 2019

(86) PCT No.: PCT/CN2019/125897
§ 371 (c)(1),
(2) Date: Jun. 15, 2021

(87) PCT Pub. No.: WO2020/135149
PCT Pub. Date: Jul. 2, 2020

(65) Prior Publication Data
US 2022/0025089 A1      Jan. 27, 2022

(30) Foreign Application Priority Data

Dec. 26, 2018  (CN) .......................... 201811603184.5
Dec. 26, 2018  (CN) .......................... 201811603198.7
Dec. 26, 2018  (CN) .......................... 201811603199.1

(51) Int. Cl.
*C08F 220/56* (2006.01)
*C08F 2/10* (2006.01)
(Continued)

(52) U.S. Cl.
CPC .............. *C08F 220/56* (2013.01); *C08F 2/10* (2013.01); *C08F 220/58* (2013.01); *C08F 226/06* (2013.01); *C09K 8/588* (2013.01)

(58) Field of Classification Search
CPC ......... C08F 220/56; C08F 2/10; C08F 226/06
See application file for complete search history.

(56) References Cited

U.S. PATENT DOCUMENTS 4,632,185 A     12/1986  Moradi-Araghi et al.
2017/0145292 A1  5/2017  Szalai et al.

FOREIGN PATENT DOCUMENTS

CN   102031101 A   4/2011
CN   102746441 A   10/2012
(Continued)

OTHER PUBLICATIONS

International Search Report of International Application No. PCT/CN2019/125897, dated Mar. 24, 2020.
(Continued)

*Primary Examiner* — Catherine S Branch
(74) *Attorney, Agent, or Firm* — Finnegan Henderson Farabow Garrett & Dunner LLP

(57) ABSTRACT

The present disclosure relates to the technical field of oilfield chemicals, and discloses an acrylamide copolymer, wherein the acrylamide copolymer comprises a structural unit A, a structural unit B and a structural unit C, wherein the structural unit A has a structure shown in Formula (1), the structural unit B has a structure shown in Formula (2), and the structural unit C has a structure shown in Formula (3) and/or Formula (4);

Formula (1)

Formula (2)

Formula (3)

(Continued)

-continued

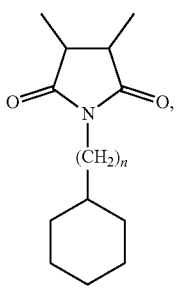

Formula (4)

wherein $R_1$ is methyl or H, $R_2$ is —OH, —$NH_2$, —COOH or $C_2$-$C_{12}$ alkyl, n is an integer between 0 and 6, and a, b and c are each independently selected from integers between 0 and 2.

17 Claims, No Drawings

(51) Int. Cl.
C08F 226/06 (2006.01)
C08F 220/58 (2006.01)
C09K 8/588 (2006.01)

(56) References Cited

FOREIGN PATENT DOCUMENTS

| CN | 103666433 A | 3/2014 |
| CN | 103951578 A | 7/2014 |
| CN | 105566565 A | 5/2016 |
| CN | 106588754 A | 4/2017 |
| WO | WO2014/209485 A1 | 12/2014 |

OTHER PUBLICATIONS

Lu Y., DMAEMA Cation Synthetic Technology Research, Shandong Chemical Industry, vol. 45, p. 24-25, 29 (2016).
Cheng J. et al., The Synthesis of N-(5-acrylamide-2,3,4-trihydroxy methylbenzyl)acrylamide and Study of Its Property, Shanghai Coatings, vol. 48, pp. 5-8 (2010).

ACRYLAMIDE COPOLYMER AND PREPARATION METHOD THEREFOR AND USE THEREOF

CROSS-REFERENCE TO RELATED APPLICATIONS

This application is a national stage filing under 35 U.S.C. § 371 of International Application No. PCT/CN2019/125897, filed Dec. 17, 2019, which claims the priority to and benefits of Chinese Patent Application Nos. 201811603198.7, 201811603184.5, and 201811603199.1, filed Dec. 26, 2018, which are incorporated herein by reference in their entireties.

FIELD

The present disclosure relates to the technical field of oilfield chemicals, in particular to an acrylamide copolymer and a preparation method and a use thereof.

BACKGROUND

The polymer flooding technology is an important technology for increasing recovery rate of petroleum, its basic principle resides in that a water-soluble polymer is added into the injection water to increase viscosity of an aqueous solution, decrease the water/oil fluidity ratio, enlarge the swept volume, improve the swept efficiency and reduce the oil saturation of the swept zone, thereby increasing the recovery rate of petroleum. It has been proved by practice that the displacing oil with polymer can significantly increase the recovery rate of petroleum, and generate tremendous economic and social benefits. For many years, the polymer used for polymer flooding is mainly the artificially synthesized partially hydrolyzed polyacrylamide. The commonly-used partially hydrolyzed polyacrylamide has the limitations that the temperature resistance and salt tolerance are low, and the viscosity of the aqueous solution is greatly reduced under the conditions of high temperature and high salinity, thus the oil displacement effects are significantly affected.

In the 1990s, the continuous rise of water content in oil fields has introduced the requirements of adjusting water absorption profiles at the deep part of oil reservoirs, forcing diversion of the liquid flow and improving the oil recovery ratio through development with water injection, such that a new hotspot of deep profile control technical research has been formed, the technology plays an important role in the aspects of stabilizing oil and controlling water, the novel chemical agents such as strong gel, weak gel, particle gel have been developed accordingly. However, when facing with the problems of serious flooding and complex oil-water relationship of oil wells in the ultra-high water content stage, the chemical agents cannot fulfill the purpose of deep profile control, the chemical agents only can perform functions in a near-distance zone of the wells, so that the on-site implementation period is short and the control effect is poor.

SUMMARY

The present disclosure aims to overcome the above problems existing in the prior art and provide an acrylamide copolymer, a preparation method and a use thereof. The acrylamide copolymer has higher viscosity under the conditions of high temperature and high mineralization degree, can reduce the interfacial tension of oil-water surface, and exhibit desirable emulsifying property.

In order to achieve the above-mentioned objects, a first aspect of the present disclosure provides an acrylamide copolymer, wherein the acrylamide copolymer comprises a structural unit A, a structural unit B and a structural unit C, wherein the structural unit A has a structure shown in Formula (1), the structural unit B has a structure shown in Formula (2), and the structural unit C has a structure shown in Formula (3) and/or Formula (4);

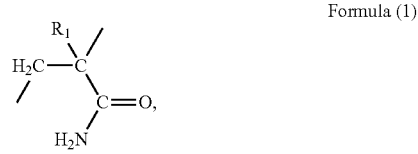

Formula (1)

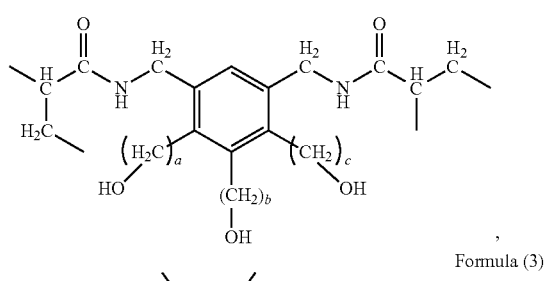

Formula (2)

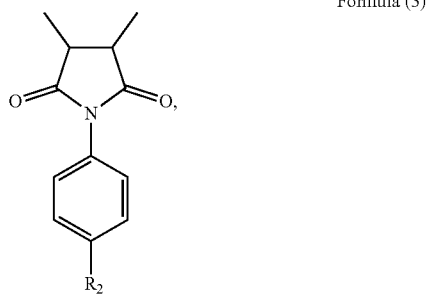

Formula (3)

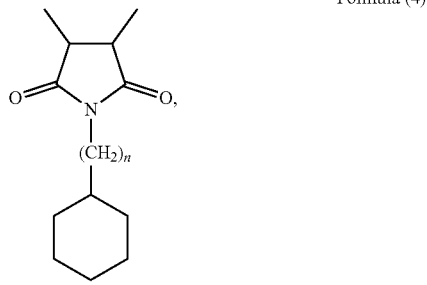

Formula (4)

wherein $R_1$ is methyl or H, $R_2$ is —OH, —NH$_2$, —COOH or $C_2$-$C_{12}$ alkyl, n is an integer between 0 and 6, and a, b and c are each independently selected from integers between 0 and 2.

In a second aspect, the present disclosure provides a method for preparing an acrylamide copolymer, the method comprises the following steps:

(1) subjecting the monomer mixture to a polymerization reaction in water under the conditions of solution polymerization and in the presence of an initiator, so as to obtain a copolymer colloid; wherein the monomer mixture comprises (meth)acrylamide, monomer X and monomer Y, wherein the monomer X has a structure shown in Formula (5), and the monomer Y has a structure shown in Formula (6) and/or Formula (7);

Formula (5)

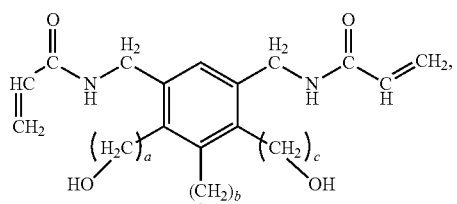

Formula (6)

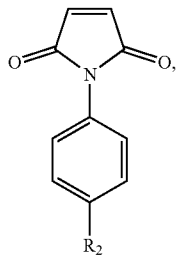

Formula (7)

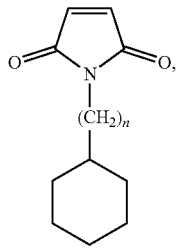

wherein $R_2$ is —OH, —NH$_2$, —COOH or $C_2$-$C_{12}$ alkyl, n is an integer between 0 and 6, and a, b and c are each independently selected from integers between 0 and 2;

(2) subjecting the copolymer colloid to a hydrolysis reaction to prepare the acrylamide copolymer.

In a third aspect, the present disclosure provides an acrylamide copolymer prepared with the method thereof.

In a fourth aspect, the present disclosure provides a use of the acrylamide copolymer of the present disclosure.

By means of the aforementioned technical solution, the acrylamide copolymer and the preparation method and use thereof provided by the present disclosure have the following favorable effects:

According to the present disclosure, the monomer X and the monomer Y are introduced into the macromolecular chain of polyacrylamide simultaneously, such that the prepared polyacrylamide copolymer has higher viscosity under the conditions of high temperature (85° C.) and high mineralization degree (33,000 mg/L), can reduce the interfacial tension of oil-water surface, and exhibit desirable emulsifying property.

When the acrylamide copolymer provided by the present disclosure is used as a profile control and flooding agent, the acrylamide copolymer is not a conventional gel system, but a high-viscosity fluid with excellent fluidity, and can fulfill the purpose of deep profile control under a certain injection pressure.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides an acrylamide copolymer, wherein the acrylamide copolymer comprises a structural unit A, a structural unit B and a structural unit C, wherein the structural unit A has a structure shown in Formula (1), the structural unit B has a structure shown in Formula (2), and the structural unit C has a structure shown in Formula (3) and/or Formula (4);

Formula (1)

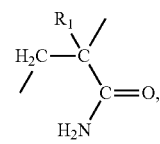

Formula (2)

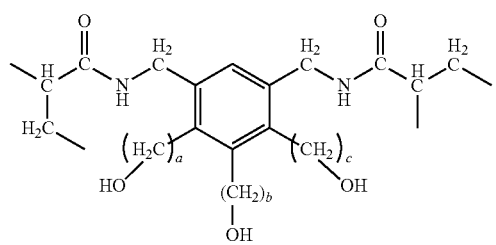

Formula (3)

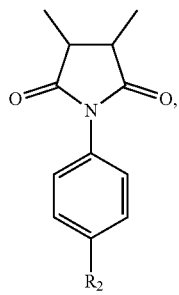

Formula (4)

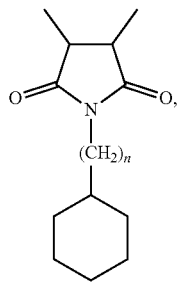

wherein $R_1$ is methyl or H, $R_2$ is —OH, —NH$_2$, —COOH or $C_2$-$C_{12}$ alkyl, n is an integer between 0 and 6, and a, b and c are each independently selected from integers between 0 and 2.

The inventors of the present disclosure have unexpectedly discovered that by simultaneously introducing the structural unit B and the structural unit C into the macromolecular structure of polyacrylamide, the prepared acrylamide copolymer has improved viscosity without affecting the interfacial tension of oil-water surface under the conditions of high temperature (85° C.) and high mineralization degree (33,000 mg/L), such that the acrylamide copolymer has desirable emulsifying property, can adapt to the environment with serious flooding and complex oil-water relationship of oil wells, and fulfill the purpose of deep profile control.

In order to further enhance viscosity of the acrylamide copolymer and reduce the interfacial tension of oil-water surface thereof, the inventors have carried out researches in regard to the content of each structural unit in the copolymer, it is discovered by the researches that the acrylamide copolymer has higher viscosity and lower surface and interfacial tension under the conditions of high temperature and high mineralization degree, when the content of the structural unit A is within a range of 85-95 wt %, the content of the structural unit B is within a range of 0.5-5 wt % and the content of the structural unit C is within a range of 1-10 wt %, based on the total weight of the acrylamide copolymer.

Further, when the content of the structural unit A is within a range of 88-95 wt %, the content of the structural unit B is within a range of 0.5-3 wt %, and the content of the structural unit C is within a range of 1-9 wt %, based on the total weight of the acrylamide copolymer, the properties of the acrylic copolymer is more excellent.

In a specific embodiment of the present disclosure, the acrylamide copolymer comprises a structural unit A, a structural unit B, and a structural unit C, wherein the structural unit C includes structures represented by Formulas (3) and (4). When the structural unit C comprises structural units represented by the Formulas (3) and (4), the total content of the structural units represented by the Formulas (3) and (4) is the content of the structural unit C.

In another specific embodiment of the present disclosure, each of a, b and c in the structural unit B represented by the Formula (2) is 0.

In the present disclosure, the content of each structural unit in the copolymer can be measured by a conventional method in the prior art, such as infrared spectroscopy, nuclear magnetism, and the feeding amount of the monomers in the polymerization process.

In the present disclosure, the content of each structural unit in the copolymer is determined by the feeding amount of monomers, and specifically, the feeding ratio of each monomer actually participating in polymerization is determined by measuring the content of the unreacted monomers, such that the content of each structural unit in the copolymer is determined.

Further, when the content of each unreacted monomer in the tested copolymer in the present disclosure is 0.02% or less, it is demonstrated that substantially all the monomers participate in the polymerization reaction. Specifically, the content of the residual monomer is measured by the liquid chromatography.

According to the present disclosure, the viscosity average molecular weight of the acrylamide copolymer is within a range of 27,000,000-32,000,000.

Preferably, the viscosity average molecular weight of the acrylamide copolymer is within a range of 28,000,000-32,000,000.

In the present disclosure, the viscosity average molecular weight is measured by an one-point method with an Ubbelohde viscometer.

In a second aspect, the present disclosure provides a method for preparing an acrylamide copolymer, the method comprises the following steps:

(1) subjecting the monomer mixture to a polymerization reaction in water under the conditions of solution polymerization and in the presence of an initiator, so as to obtain a copolymer colloid; wherein the monomer mixture comprises (meth)acrylamide, monomer X and monomer Y, wherein the monomer X has a structure shown in Formula (5), and the monomer Y has a structure shown in Formula (6) and/or Formula (7);

Formula (5)

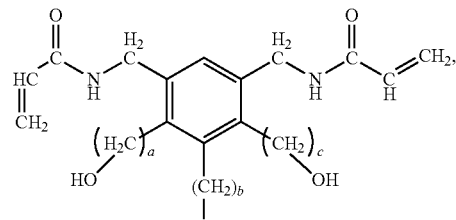

Formula (6)

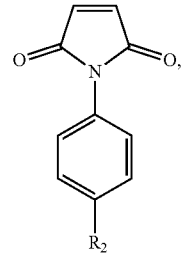

Formula (7)

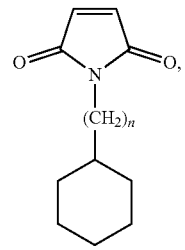

wherein $R_2$ is —OH, —NH$_2$, —COOH or $C_2$-$C_{12}$ alkyl, n is an integer between 0 and 6, and a, b and c are each independently selected from integers between 0 and 2;

(2) subjecting the copolymer colloid to a hydrolysis reaction to prepare the acrylamide copolymer.

In the present disclosure, the monomer X and the monomer Y are commercially available.

In the present disclosure, the (meth)acrylamide refers to methacrylamide and acrylamide.

In the present disclosure, the (meth)acrylamide, the monomer X and the monomer Y are copolymerized to prepare the acrylamide copolymer by adopting a copolymerization mode, and the prepared acrylamide copolymer has high viscosity under the conditions of high temperature and high mineralization degree on the premise of without affecting the surface and interfacial activity.

Specifically, the introduction of the monomer X enables the molecular chains of the copolymer to be slightly crosslinked to form a slightly crosslinked structure, so that the hydraulic volume among the molecular chains of the copolymer is enhanced, the copolymer aqueous solution still keeps high viscosity under the conditions of high temperature and high mineralization degree. The introduction of the monomer Y ensures that the molecular chains of the copolymer have a certain association reaction, so as to increases the hydraulic volume of the copolymer, thereby improving viscosity of the copolymer at high temperature and high salinity. The introduction of the monomer X and the monomer Y significantly increase viscosity of the acrylamide copolymer under the conditions of high temperature and high mineralization degree, so that the acrylamide copolymer can adapt to the environment with serious flooding and complex oil-water relationship of oil wells, and fulfill the purpose of deep profile control.

According to the present disclosure, the monomer mixture is used in an amount of 20-40 parts by weight relative to 100 parts by weight of water.

According to the present disclosure, the (meth)acrylamide is used in an amount of 85-95 wt. %, the monomer X is used in an amount of 0.5-5 wt. %, and the monomer Y is used in an amount of 1-10 wt. %, based on the total amount of the monomer mixture.

In the present disclosure, in order to further increase viscosity of the acrylamide copolymer and reduce the surface and interfacial tension thereof, the inventors have carried out researches in regard to the amount of each monomer used in the preparation of the copolymer, it is discovered by the researches that when the amounts of the monomers for polymerization satisfy the above-mentioned conditions, the prepared acrylamide copolymer has higher viscosity and a lower surface and interfacial tension under the conditions of high temperature and high mineralization degree.

Preferably, the (meth)acrylamide is used in an amount of 88-95 wt %, the monomer X is used in an amount of 0.5-3 wt %, and the monomer Y is used in an amount of 1-9 wt %, based on the total amount of the monomer mixture.

In a specific embodiment of the present disclosure, the monomer mixture comprises (meth)acrylamide, a monomer X, and a monomer Y, wherein the monomer Y comprises a monomer having a structure represented by Formula (6) and a monomer having a structure represented by Formula (7). When the monomer Y contains both the monomer having a structure represented by Formula (6) and the monomer having a structure represented by Formula (7), the total used amount of the monomers having structures represented by Formulae (6) and (7) is the used amount of the monomer Y.

In another specific embodiment of the present disclosure, each of a, b and c in the monomer X having a structure represented by the Formula (5) is 0.

According to the present disclosure, the conditions of the solution polymerization reaction comprise: the solution polymerization reaction is carried out in an inert atmosphere, the initiator is an oxidation-reduction system initiator, the temperature is within a range of 20-40° C., the time is 8-10 h, and the pH is 6-10.

In the present disclosure, the inert atmosphere may be provided by an inert gas commonly used in the prior art, for example, nitrogen. The pH can be adjusted by using the conventional means in the prior art, for example, by adding an alkaline substance such as sodium hydroxide.

Preferably, the solution polymerization conditions further comprise: the polymerization is performed in the presence of an emulsifier, a complexing agent, urea and an accelerator.

In the present disclosure, the existence of the emulsifier and the accelerator not only facilitates a polymerization system to form stable micelles, but also significantly enhances polymerization activity of the monomer X and the monomer Y, thereby increasing the molecular weight of the acrylamide copolymer, reducing the surface and interfacial activity and tension of a copolymer aqueous solution, and obviously improving the thickening and emulsifying properties of the copolymer.

In the present disclosure, the complexing agent can reduce the influence of system impurities, and the urea can improve the water solubility of the copolymer. The addition of the complexing agent and the urea is conducive to preparation of the acrylamide copolymer with excellent surface and interfacial activity and appropriate viscosity.

According to the present disclosure, the used amount of the oxidation-reduction system initiator is 0.015-0.15 part by weight, the used amount of the emulsifier is 0.05-1 part by weight, the used amount of the complexing agent is 0.01-0.1 part by weight, the used amount of the urea is 0.5-5 parts by weight, and the used amount of the accelerator is 0.2-1 part by weight, relative to 100 parts by weight of the monomer mixture.

In the present disclosure, the oxidation-reduction system initiator may be a conventional oxidation-reduction system initiator in the prior art, and preferably a persulfate oxidizer and a sulfite reducer.

Specifically, the persulfate oxidizer may be, for example, potassium persulfate, ammonium persulfate, or the like. The sulfite reducer may be, for example, potassium bisulfite, sodium bisulfite, or the like.

In the present disclosure, preferably, the persulfate oxidant and the sulfite reducer in the form of aqueous solution are introduced into the polymerization system, and further preferably, the persulfate oxidant is an aqueous potassium persulfate solution and/or aqueous ammonium persulfate solution with the mass concentration of 0.2%; the sulfite reducer is an aqueous potassium bisulfite solution and/or an aqueous sodium bisulfite solution with the mass concentration of 0.1%.

More preferably, the persulfate oxidizer is 0.01-0.1 parts by weight, the sulfite reducer is 0.005-0.05 part by weight, relative to 100 parts by weight of the monomer mixture.

According to the present disclosure, the emulsifier is a substance which enables the polymerization system to form a uniform and stable dispersion or emulsion, and is preferably sodium dodecyl sulfate and/or sodium dodecyl benzene sulfonate.

According to the present disclosure, the complexing agent is a compound capable of forming complex ions with metal ions, preferably disodium ethylenediaminetetraacetate (EDTA-2Na).

In the present disclosure, the complexing agent in the form of an aqueous solution is introduced into a polymerization system, and preferably, the complexing agent is an EDTA-2Na aqueous solution with the mass concentration of 1%.

According to the present disclosure, the accelerator is a substance being capable of accelerating the polymerization reaction and increasing the polymerization rate, and is preferably pentamethyl diethylenetriamine.

In the present disclosure, the hydrolysis reaction can be performed under an alkaline condition, which can be achieved by adding an alkaline substance such as sodium hydroxide, and the added amount of the alkaline substance is not particularly limited, those skilled in the art can adjust the amount according to the requirement of the reaction, as long as the pH of the polymerization reaction is controlled within the above range.

Preferably, the conditions of the hydrolysis reaction comprise that the temperature is within a range of 80-90° C. and the time is 2-3 h.

Preferably, after the hydrolysis reaction, the reaction product is subjected to granulating, drying, pulverizing and sieving to prepare the acrylamide copolymer particles with a desired particle size. For the sake of facilitating use, it is preferable that the particle size of the acrylamide copolymer particles is within a range of 20-80 mesh.

According to a preferred embodiment of the present disclosure:

the method for preparing the acrylamide copolymer comprises the following steps:

(a) adding acrylamide into a reactor to prepare an aqueous solution, adjusting the pH, then adding a monomer X, a monomer Y, an emulsifier, an aqueous complexing agent solution, urea and an accelerator, and sufficiently stirring the mixture to form a stable micelle;

(b) adding an initiator, blowing inert gas to blend the mixture uniformly, and subsequently sealing to perform solution polymerization reaction to obtain polymer colloid;

(c) taking out the colloid, subjecting the colloid to granulating and then adding alkaline substances, mixing uniformly, and performing hydrolysis reaction;

(d) subjecting the hydrolysis reaction product to granulating, drying, pulverizing and sieving to prepare the acrylamide copolymer particles with a desired particle size.

The polymer particles are acrylamide copolymer particles having the above structure according to the present disclosure, which can be proved by measuring the content of unreacted monomers in the copolymer.

In the present disclosure, a kneader is adopted to blend the mixture of the granulated colloid in step (c) and the alkaline substance, such that the colloid and the alkaline substance are sufficiently and uniformly mixed.

In a third aspect, the present disclosure provides an acrylamide copolymer prepared with the method thereof.

The acrylamide copolymer prepared with the method has a viscosity average molecular weight within a range of 27,000,000-32,000,000, preferably 28,000,000-32,000,000. The particle size of the acrylamide copolymer particles is within a range of 20-80 meshes.

In a fourth aspect, the present disclosure provides a use of the acrylamide copolymer of the present disclosure.

According to the present disclosure, the application is preferably an application as a profile control and flooding agent in an oil field, and the dosage of the profile control and flooding agent can be determined according to the on-site implementation requirements of the oil field.

The acrylamide copolymer provided by the present disclosure has high viscosity under the conditions of high temperature (85° C.) and high mineralization degree (33,000 mg/L), can reduce the interfacial tension of oil-water surface, and exhibit desirable emulsifying property, and can be used as a profile control and flooding agent, and perform deep profile control.

The present disclosure will be described in detail below with reference to Examples. In the following examples of the present disclosure, each of the monomer X shown in Formula (5) (each of a, b and c is 0) and the monomer shown in Formula (6) ($R_2$ in Y1 is —COOH; $R_2$ in Y2 is —NH$_2$; $R_2$ in Y3 is —OH; $R_2$ in Y4 is ethyl; $R_2$ in Y5 is n-hexyl; $R_2$ in Y6 is n-dodecyl), and the monomer shown in Formula (7) (in Y7, n=0; in Y8, n=2; in Y9, n=6) is purchased from Shanghai Aladdin Biochemical Technology Co., Ltd.;

the other raw materials used in the Examples and Comparative Examples are all commercially available products.

The viscosity-average molecular weight of the acrylamide copolymer is measured by an one-point method with an Ubbelohde viscometer.

Example 1

1) 19 g of acrylamide was added into a heat-preservation polymerization reaction bottle, 60 g of deionized water was added for dissolving acrylamide so as to prepare an aqueous solution, sodium hydroxide was further added to adjust pH to 7, 0.1 g of monomer X, 0.9 g of monomer Y1 (wherein $R_2$ was —COOH), 0.1 g of sodium dodecyl sulfate, 1 g of aqueous EDTA-2Na solution with the content of 1 wt %, 0.1 g of urea and 40 mg of pentamethyl diethylenetriamine were sequentially added and sufficiently stirred to form stable micelles;

2) nitrogen was introduced into the solution at 30° C. for removing oxygen for 30 minutes, 3 g of 0.2 wt % aqueous potassium persulfate solution and 3 g of 0.1 wt % aqueous sodium bisulfite solution were subsequently added to initiate reaction, nitrogen was continuously introduced for 5 minutes and the introduction was stopped, the reaction bottle was sealed and the polymerization reaction was performed for 10 hours to obtain polymer colloid;

3) the colloid was taken out, subjected to granulation, 0.45 g of sodium hydroxide granular alkali was then added and uniformly mixed, the hydrolysis reaction was performed at 90° C. for 2 hours;

4) the colloidal particles was taken out, and subjected to granulating, drying at 60° C. to the constant weight, pulverizing and sieving to obtain white granular acrylamide copolymer particles P1 with particle size of 20-80 mesh.

The viscosity average molecular weight of acrylamide copolymer particles P1 was 32,000,000;

It was determined based on the calculation of feeding amount that the acrylamide copolymer particles P1 contained 95 wt % of the structural unit A, 0.5 wt % of the structural unit B, and 4.5 wt % of the structural unit C (wherein $R_2$ was —COOH), based on the total weight of the copolymer.

Example 2

1) 18 g of acrylamide was added into a heat-preservation polymerization reaction bottle, 60 g of deionized water was added for dissolving acrylamide so as to prepare an aqueous solution, sodium hydroxide was further added to adjust pH to 10, 0.5 g of monomer X, 1.5 g of monomer Y2 ($R_2$ was —NH$_2$), 0.2 g of sodium dodecyl sulfate, 1 g of aqueous EDTA-2Na solution with the content of 1 wt %, 0.5 g of urea and 100 mg of pentamethyl diethylenetriamine were sequentially added and sufficiently stirred to form stable micelles;

2) nitrogen was introduced into the solution at 25° C. for removing oxygen for 30 minutes, 4 g of 0.2 wt % aqueous potassium persulfate solution and 4 g of 0.1 wt % aqueous sodium bisulfite solution were subsequently added to initiate reaction, nitrogen was continuously introduced for 5 minutes and the introduction was stopped, the reaction bottle was sealed and the polymerization reaction was performed for 8 hours to obtain polymer colloid;

3) the colloid was taken out, subjected to granulation, 0.5 g of sodium hydroxide granular alkali was then added and uniformly mixed, the hydrolysis reaction was performed at 85° C. for 2.5 hours;

4) the colloidal particles was taken out, and subjected to granulating, drying at 60° C. to the constant weight, pulverizing and sieving to obtain white granular acrylamide copolymer particles P2 with particle size of 20-80 mesh.

The viscosity average molecular weight of acrylamide copolymer particles P2 was 30,000,000;

It was determined based on the calculation of feeding amount that the acrylamide copolymer particles P2 contained 90 wt % of the structural unit A, 2.5 wt % of the structural unit B, and 7.5 wt % of the structural unit C (wherein $R_2$ was —$NH_2$), based on the total weight of the copolymer.

Example 3

1) 18 g of acrylamide was added into a heat-preservation polymerization reaction bottle, 60 g of deionized water was added for dissolving acrylamide so as to prepare an aqueous solution, sodium hydroxide was further added to adjust pH to 7.5, 0.2 g of monomer X, 1.8 g of monomer Y1 (wherein $R_2$ was —COOH), 0.1 g of sodium dodecyl sulfate, 1 g of aqueous EDTA-2Na solution with the content of 1 wt %, 0.9 g of urea and 150 mg of pentamethyl diethylenetriamine were sequentially added and sufficiently stirred to form stable micelles;

2) nitrogen was introduced into the solution at 30° C. for removing oxygen for 30 minutes, 10 g of 0.2 wt % aqueous potassium persulfate solution and 10 g of 0.1 wt % aqueous sodium bisulfite solution were subsequently added to initiate reaction, nitrogen was continuously introduced for 5 minutes and the introduction was stopped, the reaction bottle was sealed and the polymerization reaction was performed for 9 hours to obtain polymer colloid;

3) the colloid was taken out, subjected to granulation, 0.45 g of sodium hydroxide granular alkali was then added and uniformly mixed, the hydrolysis reaction was performed at 85° C. for 2 hours;

4) the colloidal particles was taken out, and subjected to granulating, drying at 60° C. to the constant weight, pulverizing and sieving to obtain white granular acrylamide copolymer particles P3 with particle size of 20-80 mesh.

The viscosity average molecular weight of acrylamide copolymer particles P3 was 28,000,000;

It was determined based on the calculation of feeding amount that the acrylamide copolymer particles P3 contained 90 wt % of the structural unit A, 1 wt % of the structural unit B, and 9 wt % of the structural unit C (wherein $R_2$ was —COOH), based on the total weight of the copolymer.

Example 4

1) 17 g of acrylamide was added into a heat-preservation polymerization reaction bottle, 60 g of deionized water was added for dissolving acrylamide so as to prepare an aqueous solution, sodium hydroxide was further added to adjust pH to 6, 1 g of monomer X, 2 g of monomer Y3 (wherein $R_2$ was —OH), 0.2 g of sodium dodecyl sulfate, 1 g of aqueous EDTA-2Na solution with the content of 1 wt %, 1 g of urea and 200 mg of pentamethyl diethylenetriamine were sequentially added and sufficiently stirred to form stable micelles;

2) nitrogen was introduced into the solution at 20° C. for removing oxygen for 30 minutes, 2 g of 0.2 wt % aqueous potassium persulfate solution and 2 g of 0.1 wt % aqueous sodium bisulfite solution were subsequently added to initiate reaction, nitrogen was continuously introduced for 5 minutes and the introduction was stopped, the reaction bottle was sealed and the polymerization reaction was performed for 8 hours to obtain polymer colloid;

3) the colloid was taken out, subjected to granulation, 0.4 g of sodium hydroxide granular alkali was then added and uniformly mixed, the hydrolysis reaction was performed at 80° C. for 3 hours;

4) the colloidal particles was taken out, and subjected to granulating, drying at 60° C. to the constant weight, pulverizing and sieving to obtain white granular acrylamide copolymer particles P4 with particle size of 20-80 mesh.

The viscosity average molecular weight of acrylamide copolymer particles P4 was 27,000,000;

It was determined based on the calculation of feeding amount that the acrylamide copolymer particles P4 contained 85 wt % of the structural unit A, 5 wt % of the structural unit B, and 10 wt % of the structural unit C (wherein $R_2$ was —OH), based on the total weight of the copolymer.

Example 5

The acrylamide copolymer was prepared according to the method in Example 1, except that acrylamide was used in an amount of 19.6 g and monomer Y1 was used in an amount of 0.3 g, so as to prepare acrylamide copolymer particles P5 with particle size of 20-80 mesh.

The viscosity average molecular weight of acrylamide copolymer particles P5 was 22,000,000;

It was determined based on the calculation of feeding amount that the acrylamide copolymer particles P5 contained 98 wt % of the structural unit A, 0.5 wt % of the structural unit B, and 1.5 wt % of the structural unit C, based on the total weight of the copolymer.

Example 6

The acrylamide copolymer was prepared according to the method in Example 1, except that acrylamide was used in an amount of 16 g and monomer X was used in an amount of 2.5 g, so as to prepare acrylamide copolymer particles P6 with particle size of 20-80 mesh.

The viscosity average molecular weight of acrylamide copolymer particles P6 was 21,000,000;

It was determined based on the calculation of feeding amount that the acrylamide copolymer particles P6 contained 80 wt % of the structural unit A, 12.5 wt % of the structural unit B, and 7.5 wt % of the structural unit C, based on the total weight of the copolymer.

Example 7

The acrylamide copolymer was prepared according to the method in Example 1, except that the monomer Y1 was replaced with the monomer Y4 (wherein $R_2$ was ethyl) to prepare acrylamide copolymer particles P7 with particle size of 20-80 mesh.

The viscosity average molecular weight of acrylamide copolymer particles P7 was 32,000,000;

It was determined based on the calculation of feeding amount that the acrylamide copolymer particles P7 contained 95 wt % of the structural unit A, 0.5 wt % of the structural unit B, and 4.5 wt % of the structural unit C (wherein $R_2$ was ethyl), based on the total weight of the copolymer.

Example 8

The acrylamide copolymer was prepared according to the method in Example 2, except that the monomer Y2 was replaced with the monomer Y6 (wherein $R_2$ was n-dodecyl) to prepare acrylamide copolymer particles P8 with particle size of 20-80 mesh.

The viscosity average molecular weight of acrylamide copolymer particles P8 was 29,000,000;

It was determined based on the calculation of feeding amount that the acrylamide copolymer particles P8 contained 90 wt % of the structural unit A, 2.5 wt % of the structural unit B, and 7.5 wt % of the structural unit C (wherein $R_2$ was n-dodecyl), based on the total weight of the copolymer.

Example 9

The acrylamide copolymer was prepared according to the method in Example 3, except that the monomer Y1 was replaced with the monomer Y4 (wherein $R_2$ was ethyl) to prepare acrylamide copolymer particles P9 with particle size of 20-80 mesh.

The viscosity average molecular weight of acrylamide copolymer particles P9 was 30,000,000;

It was determined based on the calculation of feeding amount that the acrylamide copolymer particles P9 contained 90 wt % of the structural unit A, 1 wt % of the structural unit B, and 9 wt % of the structural unit C (wherein $R_2$ was ethyl), based on the total weight of the copolymer.

Example 10

The acrylamide copolymer was prepared according to the method in Example 4, except that the monomer Y3 was replaced with the monomer Y5 (wherein $R_2$ was n-hexyl) to prepare acrylamide copolymer particles P10 with particle size of 20-80 mesh.

The viscosity average molecular weight of acrylamide copolymer particles P10 was 27,000,000;

It was determined based on the calculation of feeding amount that the acrylamide copolymer particles P10 contained 85 wt % of the structural unit A, 5 wt % of the structural unit B, and 10 wt % of the structural unit C (wherein $R_2$ was n-hexyl), based on the total weight of the copolymer.

Example 11

The acrylamide copolymer was prepared according to the method in Example 7, except that the acrylamide was used in an amount of 19.6 g and the monomer Y4 was used in an amount of 0.3 g, so as to prepare acrylamide copolymer particles P11 with particle size of 20-80 mesh.

The viscosity average molecular weight of acrylamide copolymer particles P11 was 22,000,000;

It was determined based on the calculation of feeding amount that the acrylamide copolymer particles P11 contained 98 wt % of the structural unit A, 0.5 wt % of the structural unit B, and 1.5 wt % of the structural unit C, based on the total weight of the copolymer.

Example 12

The acrylamide copolymer was prepared according to the method in Example 7, except that the acrylamide was used in an amount of 16 g and the monomer X was used in an amount of 2.5 g, so as to prepare acrylamide copolymer particles P12 with particle size of 20-80 mesh.

The viscosity average molecular weight of acrylamide copolymer particles P12 was 20,000,000;

It was determined based on the calculation of feeding amount that the acrylamide copolymer particles P12 contained 80 wt % of the structural unit A, 12.5 wt % of the structural unit B, and 7.5 wt % of the structural unit C, based on the total weight of the copolymer.

Example 13

The acrylamide copolymer was prepared according to the method in Example 1, except that the monomer Y1 was replaced with the monomer Y7 (wherein n=0) to prepare acrylamide copolymer particles P13 with particle size of 20-80 mesh.

The viscosity average molecular weight of acrylamide copolymer particles P13 was 32,000,000;

It was determined based on the calculation of feeding amount that the acrylamide copolymer particles P13 contained 95 wt % of the structural unit A, 0.5 wt % of the structural unit B, and 4.5 wt % of the structural unit C (wherein n=0), based on the total weight of the copolymer.

Example 14

The acrylamide copolymer was prepared according to the method in Example 2, except that the monomer Y2 was replaced with the monomer Y8 (wherein n=2) to prepare acrylamide copolymer particles P14 with particle size of 20-80 mesh.

The viscosity average molecular weight of acrylamide copolymer particles P14 was 29,000,000;

It was determined based on the calculation of feeding amount that the acrylamide copolymer particles P14 contained 90 wt % of the structural unit A, 2.5 wt % of the structural unit B, and 7.5 wt % of the structural unit C (wherein n=2), based on the total weight of the copolymer.

Example 15

The acrylamide copolymer was prepared according to the method in Example 3, except that the monomer Y1 was replaced with the monomer Y9 (wherein n=6) to prepare acrylamide copolymer particles P15 with particle size of 20-80 mesh.

The viscosity average molecular weight of acrylamide copolymer particles P15 was 30,000,000;

It was determined based on the calculation of feeding amount that the acrylamide copolymer particles P15 contained 90 wt % of the structural unit A, 1 wt % of the structural unit B, and 9 wt % of the structural unit C (wherein n=6), based on the total weight of the copolymer.

Example 16

The acrylamide copolymer was prepared according to the method in Example 4, except that the monomer Y3 was replaced with the monomer Y7 (wherein n=0) to prepare acrylamide copolymer particles P17 with particle size of 20-80 mesh.

The viscosity average molecular weight of acrylamide copolymer particles P17 was 27,000,000;

It was determined based on the calculation of feeding amount that the acrylamide copolymer particles P16 contained 85 wt % of the structural unit A, 5 wt % of the structural unit B, and 10 wt % of the structural unit C (wherein n=0), based on the total weight of the copolymer.

Example 17

The acrylamide copolymer was prepared according to the method in Example 13, except that the acrylamide was used in an amount of 19.6 g and the monomer Y7 was used in an amount of 0.3 g, so as to prepare acrylamide copolymer particles P17 with particle size of 20-80 mesh.

The viscosity average molecular weight of acrylamide copolymer particles P17 was 21,000,000;

It was determined based on the calculation of feeding amount that the acrylamide copolymer particles P17 contained 98 wt % of the structural unit A, 0.5 wt % of the structural unit B, and 1.5 wt % of the structural unit C, based on the total weight of the copolymer.

Example 18

The acrylamide copolymer was prepared according to the method in Example 13, except that the acrylamide was used in an amount of 16 g and the monomer X was used in an amount of 2.5 g, so as to prepare acrylamide copolymer particles P18 with particle size of 20-80 mesh.

The viscosity average molecular weight of acrylamide copolymer particles P18 was 20,000,000;

It was determined based on the calculation of feeding amount that the acrylamide copolymer particles P18 contained 80 wt % of the structural unit A, 12.5 wt % of the structural unit B, and 7.5 wt % of the structural unit C, based on the total weight of the copolymer.

Example 19

The acrylamide copolymer was prepared according to the method in Example 1, except that the monomer Y7 was used for partially replacing Y1, and the weight ratio of the monomer Y7 to the monomer Y1 was 1:1. The acrylamide copolymer particles P19 with particle size of 20-80 mesh was prepared.

The viscosity average molecular weight of P19 was 30,000,000;

It was determined based on the calculation of feeding amount that the acrylamide copolymer particles P19 contained 95 wt % of the structural unit A, 0.5 wt % of the structural unit B, 2.25 wt % of the structural unit C1 (wherein $R_2$ was —COOH) and 2.25 wt % of the structural unit C2 (wherein n=0), based on the total weight of the copolymer.

Comparative Example 1

The acrylamide copolymer was prepared according to the method in Example 1, except that the monomer Y1 was replaced with an equal mass of the monomer X, so as to prepare acrylamide copolymer particles D1 with particle size of 20 to 80 mesh.

The viscosity average molecular weight of D1 was 20,000,000;

It was determined based on the calculation of feeding amount that the acrylamide copolymer particles D1 contained 95 wt % of the structural unit A and 5 wt % of the structural unit B, based on the total weight of the copolymer.

Comparative Example 2

The acrylamide copolymer was prepared according to the method in Example 1, except that the monomer X was replaced with an equal mass of the monomer Y1, so as to prepare acrylamide copolymer particles D2 with particle size of 20 to 80 mesh.

The viscosity average molecular weight of D2 was 19,000,000;

It was determined based on the calculation of feeding amount that the acrylamide copolymer particles D2 contained 95 wt % of the structural unit A and 5 wt % of the structural unit C, based on the total weight of the copolymer.

Comparative Example 3

The acrylamide copolymer was prepared according to the method in Example 7, except that the monomer X was replaced with an equal mass of the monomer Y4, so as to prepare acrylamide copolymer particles D3 with particle size of 20 to 80 mesh.

The viscosity average molecular weight of D3 was 22,000,000;

It was determined based on the calculation of feeding amount that the acrylamide copolymer particles D3 contained 95 wt % of the structural unit A and 5 wt % of the structural unit C, based on the total weight of the copolymer.

Comparative Example 4

The acrylamide copolymer was prepared according to the method in Example 13, except that the monomer X was replaced with an equal mass of the monomer Y7, so as to prepare acrylamide copolymer particles D1 with particle size of 20 to 80 mesh.

The viscosity average molecular weight of D1 was 19,000,000;

It was determined based on the calculation of feeding amount that the acrylamide copolymer particles D4 contained 95 wt % of the structural unit A and 5 wt % of the structural unit C, based on the total weight of the copolymer.

Test Example

The acrylamide copolymer particles obtained in the Examples and Comparative Examples were prepared into the aqueous solutions having a content of 0.15 wt %, the apparent viscosity, surface tension and interfacial tension of each aqueous solution were measured, and the measurement results were shown in Table 1.

Wherein the apparent viscosity of the aqueous acrylamide copolymer solution was measured by a Brookfield viscometer, the test temperature was 85° C. and the mineralization degree was 33,000 mg/L. The larger was the apparent viscosity, the more excellent were the temperature resistance and salt tolerance of the aqueous copolymer solution;

the surface tension of the aqueous acrylamide copolymer solution in pure water was measured by a DCAT-21 surface tension meter at a measuring temperature of 25° C. The smaller was the surface tension, the higher was the surface activity of the aqueous copolymer solution;

the interfacial tension of the aqueous acrylamide copolymer solution was measured by an interface tension meter TX500C manufactured by the Kono Industries Co., Ltd. in United States of America (USA), and the test temperature was 80° C., and the experimental oil was kerosene. The smaller was the interfacial tension, the more excellent was the interfacial activity of the aqueous copolymer solution.

TABLE 1

| Product numbers | Apparent viscosity (mPa.s) | Surface tension (mN/m) | Interfacial tension (mN/m) |
|---|---|---|---|
| P1 | 88.3 | 29.8 | $6 \times 10^{-2}$ |
| P2 | 79.9 | 28.2 | $5 \times 10^{-2}$ |

TABLE 1-continued

| Product numbers | Apparent viscosity (mPa.s) | Surface tension (mN/m) | Interfacial tension (mN/m) |
|---|---|---|---|
| P3 | 75.8 | 28.3 | $6 \times 10^{-2}$ |
| P4 | 70.2 | 30.5 | $8 \times 10^{-2}$ |
| P5 | 47.1 | 35.6 | $11.8 \times 10^{-2}$ |
| P6 | 48.6 | 34.8 | $10.6 \times 10^{-2}$ |
| P7 | 85.6 | 28.3 | $6 \times 10^{-2}$ |
| P8 | 72.5 | 28.4 | $7 \times 10^{-2}$ |
| P9 | 77.8 | 28.4 | $8 \times 10^{-2}$ |
| P10 | 64.8 | 30.3 | $9 \times 10^{-2}$ |
| P11 | 46.1 | 35.9 | $11.9 \times 10^{-2}$ |
| P12 | 47.9 | 34.6 | $10.1 \times 10^{-2}$ |
| P13 | 82.3 | 29.2 | $7 \times 10^{-2}$ |
| P14 | 70.3 | 31.2 | $6 \times 10^{-2}$ |
| P15 | 74.2 | 29.1 | $5 \times 10^{-2}$ |
| P16 | 65.3 | 31.6 | $9 \times 10^{-2}$ |
| P17 | 40.2 | 36.8 | $11 \times 10^{-2}$ |
| P18 | 46.7 | 35.6 | $10.8 \times 10^{-2}$ |
| P19 | 76.7 | 29.5 | $7 \times 10^{-2}$ |
| D1 | 42.1 | 35.2 | $10.6 \times 10^{-2}$ |
| D2 | 40.1 | 34.4 | $10.1 \times 10^{-2}$ |
| D3 | 38.3 | 34.6 | $10.6 \times 10^{-2}$ |
| D4 | 38.2 | 34.9 | $10.2 \times 10^{-2}$ |

The results in Table 1 demonstrate that the acrylamide copolymer provided by the present disclosure has higher apparent viscosity at 85° C. and a mineralization degree of 33,000 mg/L, and exhibits excellent high-temperature and high-salt resistance; in addition, the copolymer has lower surface tension and interfacial tension, shows excellent surface activity and can be used as a profile control and flooding agent.

Specifically, the acrylamide copolymer comprising the structural unit A, the structural unit B and the structural unit C simultaneously can improve the apparent viscosity of the acrylamide copolymer on the premise of not affecting the surface and interfacial properties of the acrylamide copolymer, so that the acrylamide copolymer shows excellent high-temperature and high-salt resistance.

When the content of the structural unit A, the structural unit B and the structural unit C in the acrylamide copolymer is within a specific range, the provided acrylamide copolymer not only shows high apparent viscosity, but also obviously improves the surface and interfacial activity, and shows more excellent high-temperature resistance and high salinity tolerance.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An acrylamide copolymer, wherein the acrylamide copolymer comprises a structural unit A, a structural unit B, and a structural unit C, wherein the structural unit A has a structure shown in Formula (1), the structural unit B has a structure shown in Formula (2), and the structural unit C has a structure shown in Formula (3) and/or Formula (4);

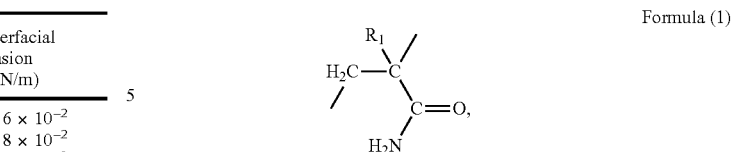

Formula (1)

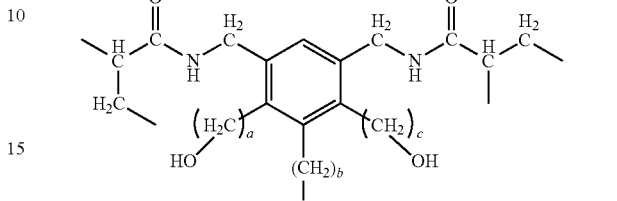

Formula (2)

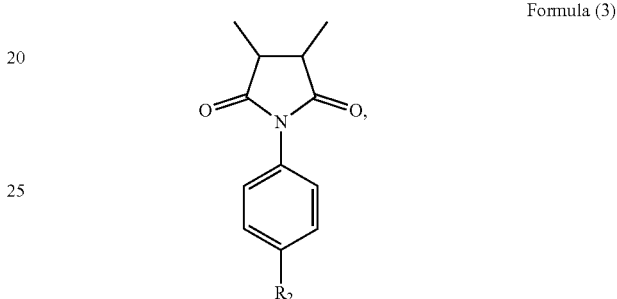

Formula (3)

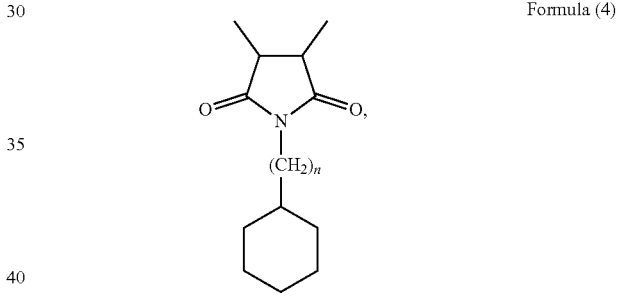

Formula (4)

wherein $R_1$ is methyl or H, $R_2$ is —OH, —NH$_2$, —COOH or $C_2$-$C_{12}$ alkyl, n is an integer in a range of 0-6, and a, b and c are each independently selected from integers in a range of 0-2.

2. The acrylamide copolymer of claim 1, wherein the content of the structural unit A is within a range of 85-95 wt %, the content of the structural unit B is within a range of 0.5-5 wt %, and the content of the structural unit C is within a range of 1-10 wt %, based on the total weight of the acrylamide copolymer.

3. The acrylamide copolymer of claim 1, wherein the viscosity average molecular weight of the acrylamide copolymer is within a range of 27,000,000-32,000,000.

4. A method for preparing an acrylamide copolymer, comprising:

(1) subjecting a monomer mixture to a polymerization reaction in water under the conditions of solution polymerization and in the presence of an initiator, so as to obtain a copolymer colloid; wherein the monomer mixture comprises (meth)acrylamide, monomer X, and monomer Y, wherein the monomer X has a structure shown in Formula (5), and the monomer Y has a structure shown in Formula (6) and/or Formula (7);

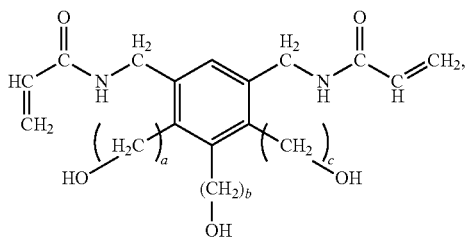

Formula (5)

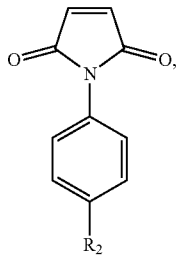

Formula (6)

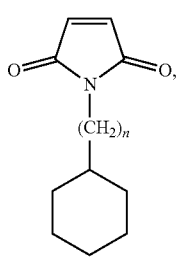

Formula (7)

wherein $R_2$ is —OH, —$NH_2$, —COOH or $C_2$-$C_{12}$ alkyl, n is an integer in a range of 0-6, and a, b and c are each independently selected from integers in a range of 0-2; and (2) subjecting the copolymer colloid to a hydrolysis reaction to prepare the acrylamide copolymer.

5. The method of claim 4, wherein the monomer mixture is used in an amount of 20-40 parts by weight relative to 100 parts by weight of water.

6. The method of claim 4, wherein the conditions of the solution polymerization reaction comprise: the solution polymerization reaction is carried out in an inert atmosphere, the initiator is an oxidation-reduction system initiator, the temperature is in a range of 20-40° C., the time is in a range of 8-10 h, and the pH is in a range of 6-10.

7. The method of claim 6, wherein the oxidation-reduction system initiator is a persulfate oxidizer and a sulfite reducer.

8. The method of claim 4, wherein the conditions of the hydrolysis reaction comprise that the temperature is in a range of 80-90° C. and the time is in a range of 2-3 h.

9. The acrylamide copolymer of claim 2, wherein the content of the structural unit A is within a range of 88-95 wt %, the content of the structural unit B is within a range of 0.5-3 wt %, and the content of the structural unit C is within a range of 1-9 wt %, based on the total weight of the acrylamide copolymer.

10. The acrylamide copolymer of claim 3, wherein the viscosity average molecular weight of the acrylamide copolymer is within a range of 27,000,000-32,000,000.

11. The method of claim 5, wherein the (meth) acrylamide is used in an amount of 85-95 wt. %, the monomer X is used in an amount of 0.5-5 wt. %, and the monomer Y is used in an amount of 1-10 wt. %, based on the total amount of the monomer mixture.

12. The method of claim 11, wherein the (meth) acrylamide is used in an amount of 88-95 wt %, the monomer X is used in an amount of 0.5-3 wt %, and the monomer Y is used in an amount of 1-9 wt %, based on the total amount of the monomer mixture.

13. The method of claim 4, wherein the solution polymerization conditions further comprise: the polymerization is performed in the presence of an emulsifier, a complexing agent, urea, and an accelerator.

14. The method of claim 13, wherein the used amount of the oxidation-reduction system initiator is 0.015-0.15 part by weight, the used amount of the emulsifier is 0.05-1 part by weight, the used amount of the complexing agent is 0.01-0.1 part by weight, the used amount of the urea is 0.5-5 parts by weight, and the used amount of the accelerator is 0.2-1 part by weight, relative to 100 parts by weight of the monomer mixture.

15. The method of claim 13, wherein the emulsifier is sodium dodecyl sulfate and/or sodium dodecyl benzene sulfonate.

16. The method of claim 13, wherein the complexing agent is disodium ethylenediaminetetraacetate.

17. The method of claim 13, wherein the accelerator is pentamethyl diethylenetriamine.

\* \* \* \* \*